(12) United States Patent
Lehureau

(10) Patent No.: US 7,130,053 B2
(45) Date of Patent: Oct. 31, 2006

(54) DEVICE FOR MEASURING A NON-RECIPROCAL EFFECT, IN PARTICULAR FIBER-OPTIC GYRO

(75) Inventor: Jean-Claude Lehureau, Sainte Genevieve des Bois (FR)

(73) Assignee: Thales, Neuilly sur Seine (FR)

( * ) Notice: Subject to any disclaimer, the term of this patent is extended or adjusted under 35 U.S.C. 154(b) by 126 days.

(21) Appl. No.: 10/476,248

(22) PCT Filed: May 14, 2002

(86) PCT No.: PCT/FR02/01622

§ 371 (c)(1),
(2), (4) Date: Oct. 30, 2003

(87) PCT Pub. No.: WO02/095332

PCT Pub. Date: Nov. 28, 2002

(65) Prior Publication Data

US 2004/0136007 A1 Jul. 15, 2004

(30) Foreign Application Priority Data

May 18, 2001 (FR) .................................. 01/06602

(51) Int. Cl.
*G01C 19/72* (2006.01)
(52) U.S. Cl. ..................................... 356/460
(58) Field of Classification Search ................ 356/460, 356/462, 464, 350, 483, 487, 477, 491, 360
See application file for complete search history.

(56) References Cited

U.S. PATENT DOCUMENTS 4,286,878 A * 9/1981 Pircher ........................ 356/460
4,456,377 A * 6/1984 Shaw et al. .................. 356/460
5,270,791 A * 12/1993 Lefevre et al. ............. 356/460
5,677,767 A * 10/1997 Shirasaki et al. ........... 356/460

FOREIGN PATENT DOCUMENTS

DE 198 03 223 C 7/1999
GB 2 046 470 A 11/1980

OTHER PUBLICATIONS

*Gyromètre à fibre optique: principles et technologies* [Fiber-optic gyrometer: principles and technologies] authored by H.J. Arditty, Ph. Graindorge and H.C. Lefevre from the THOMSON-CSF Central Research Laboratory, was published in *Revue technique THOMSON-CSF*, vol. 15, N°3, pp. 777 to 807, in Sep. 1983.

* cited by examiner

Primary Examiner—Hwa (Andrew) Lee
Assistant Examiner—Marissa J Detschel
(74) Attorney, Agent, or Firm—Lowe Hauptman & Berner LLP

(57) ABSTRACT

The invention relates to the field of devices for measuring a nonreciprocal effect and especially to the field of fiber-optic gyrometers. Disclosed a device for measuring a nonreciprocal effect comprising a light source, a monomode spatial filter, a Sagnac ring having two branches, a light splitter, and a light detector. The splitter is a polarization splitter. The filter is nonpolarizing. The detector includes a system for analyzing the polarization state. The light splitter devides the light over branches of the ring. The invention can be applied to other devices for measuring a nonreciprocal effect, especially fiber-optic magnetometers.

21 Claims, 3 Drawing Sheets

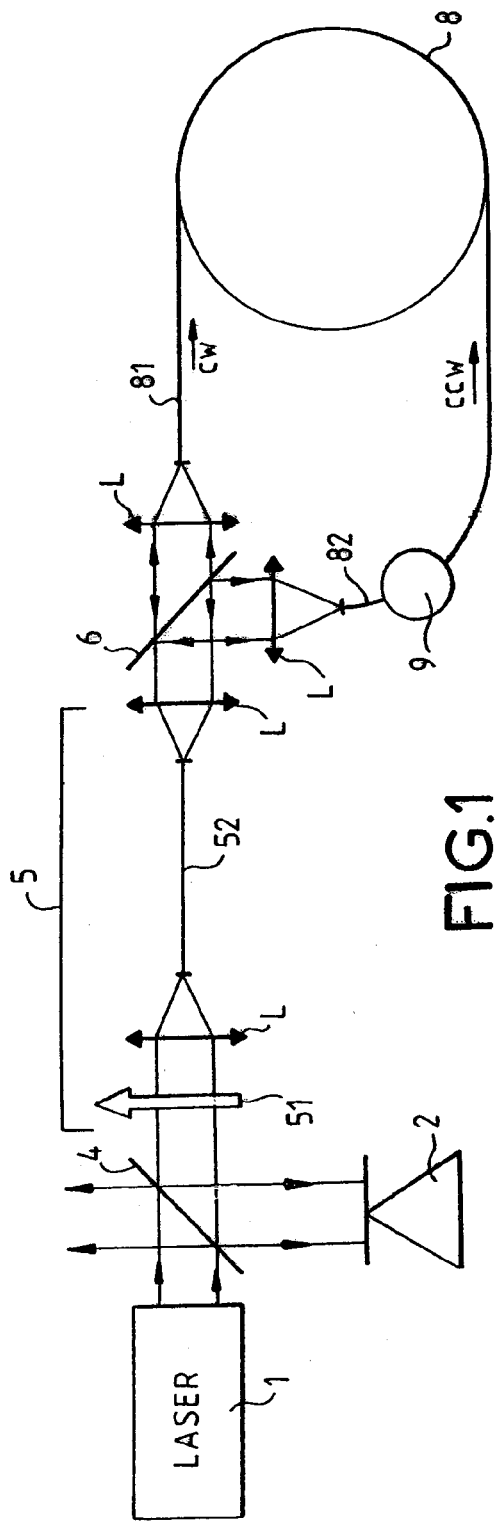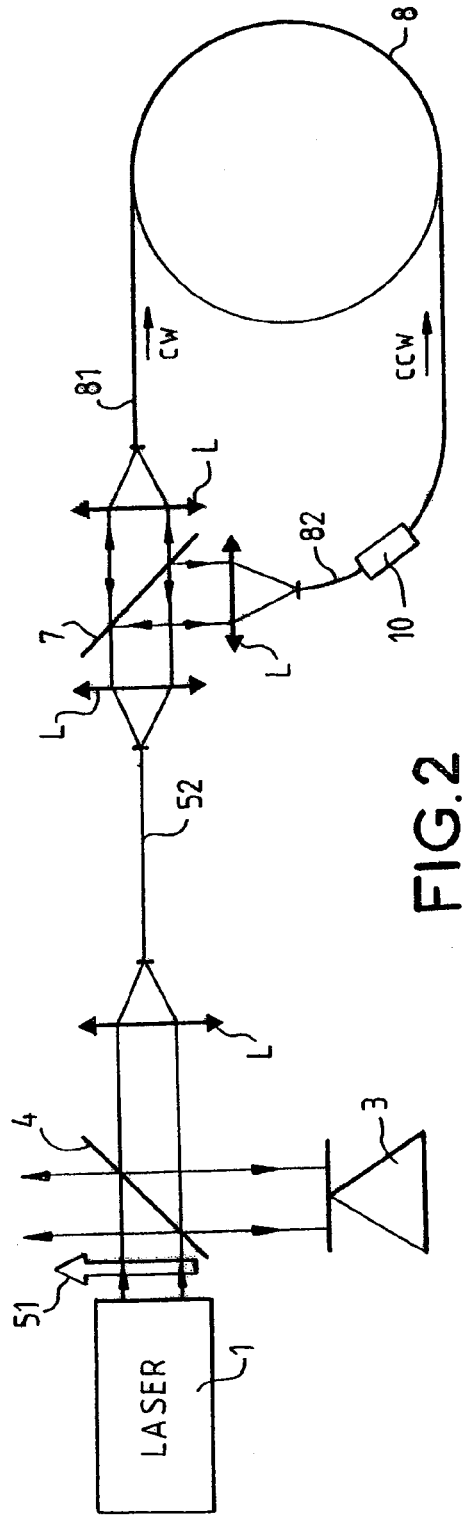
PRIOR ART

DEVICE FOR MEASURING A NON-RECIPROCAL EFFECT, IN PARTICULAR FIBER-OPTIC GYRO

FIELD OF THE INVENTION

The invention relates to the field of devices for measuring a nonreciprocal effect, and especially to the field of fiber-optic gyrometers. The invention may also be applied to other types of devices for measuring a nonreciprocal effect such as, for example, a fiber-optic magnetometer.

BACKGROUND OF THE INVENTION

In the field of devices for measuring a nonreciprocal effect in general and in the field of fiber-optic gyrometers in particular, one prior art document consists of an article incorporated by reference into the present patent application. This article, entitled "*Gyromètre à fibre optique: principes et technologies*" [Fiber-optic gyrometer: principles and technologies] authored by H. J. Arditty, Ph. Graindorge and H. C. Lefevre from the THOMSON-CSF Central Research Laboratory, was published in *Revue technique THOMSON-CSF*, Vol. 15, No. 3, pages 777 to 807, in September 1983. This article describes in particular a "minimal" configuration of a fiber-optic gyrometer and gives a few illustrative examples thereof. This minimal fiber-optic gyrometer configuration is based on the use of a phase modulator placed in one of the branches of the Sagnac ring of the fiber-optic gyrometer.

More precisely, the fiber-optic gyrometer of this prior art comprises several optical components among which are: a light source, a light detector, a monomode spatial filter, a Sagnac ring having two branches, two light splitters, said optical elements being placed so that, on the one hand, a first portion of the light emitted by the source can pass in succession through the first splitter, through the filter, through the second splitter, to enter the first branch of the ring and emerge via the second branch of the ring, pass through the second splitter, through the filter and through the first splitter and arrive at the detector, and on the other hand, a second portion of the light emitted by the source can pass in succession through the first splitter, through the filter, through the second splitter, to enter via the second branch of the ring and emerge via the first branch of the ring, pass through the second splitter, through the filter and through the first splitter and arrive at the detector, said optical elements being structured and placed in such a way that the light, that emanates from the source and arrives at the second splitter before having passed into the Sagnac ring, is polarized light. The second splitter is a semireflecting plate. The monomode spatial filter is polarizing, being formed by the combination of an actual monomode spatial filter and a polarizer.

More precisely still, FIG. 1 shows schematically an example of a fiber-optic gyrometer according to the prior art. The path of the light beams is indicated in the FIG. 1 by means of arrows. A laser light source 1 emits a laser beam. This laser beam arrives at a first light splitter 4, which is a semireflecting plate, only one portion of the light beam passing through the first light splitter 4 toward the polarizer 51. The light beam then passes through the polarizer 51 and emerges therefrom polarized in a given polarization direction. The light beam is then focused by a lens L onto an entrance of an optical fiber 52 constituting the actual monomode spatial filter. At the exit of the optical fiber 52, the light beam passes through a lens L before arriving at a second light splitter 6, which is a semireflecting plate. The laser beam is divided into two approximately equal portions, each portion being focused onto one of the entrances 81 or 82 of the Sagnac ring 8, which is a reel of optical fiber. The direction of circulation of the light from the branch 81 toward the branch 82 is called cw (standing for clockwise) and the direction of circulation of the light from the branch 82 toward the branch 81 is called ccw (standing for counterclockwise). The branch 82, for example, includes a phase modulator 9. After having emerged from the Sagnac ring 8, the two laser beam portions pass through the second splitter 6, only partly, to be superposed as a laser beam focused by a lens L onto one end of the optical fiber 52. On leaving the optical fiber 52, the laser beam passes through a lens L and then the polarizer 51, the combination of the optical fiber 52 and the polarizer 51 constituting a polarizing monomode spatial filter 5. One portion of the laser beam, which is now again polarized in the initial given polarization direction, is reflected by the first splitter 4 onto the detector 2. Thanks to the phase modulation effected by the phase modulator 9, the signal detected by the detector 2 is representative of the Sagnac effect, and therefore of the speed of rotation to which the fiber-optic gyrometer is subjected, and can be exploited.

One of the drawbacks that this prior art has is that the phase modulator 9 used in the fiber-optic gyrometer of this prior art is too complex and too expensive.

BRIEF SUMMARY OF THE INVENTION

The invention proposes a novel structure of a device for measuring a nonreciprocal effect in general and of a fiber-optic gyrometer in particular. This novel structure is distinguished from the structure of the prior art by several features. One feature is the elimination of the phase modulator. Another feature is the use, as second splitter, of a polarization splitter. Yet another feature the use, in the return path of the light between the Sagnac ring and the detector, of a monomode spatial filter that is nonpolarizing. Still another feature is the use of a particular type of detector capable of analyzing the state of polarization of the return light signal, which polarization state is representative of the Sagnac effect. This results, therefore, in a nonreciprocal effect to which the measuring device according to the invention in general is subjected or of the speed of rotation to which the fiber-optical gyrometer according to the invention in particular is subjected.

The invention provides a device for measuring a nonreciprocal effect, comprising a light source, a monomode spatial filter, a Sagnac ring having two branches, and a light splitter that divides the light into the branches of the ring and a light detector. The splitter is a polarization splitter, and the filter is nonpolarizing. The detector includes a system for analyzing the polarization state.

More precisely, the invention also provides a device for measuring a nonreciprocal effect comprising several optical components among which are: a light source, a light detector, a monomode spatial filter, a Sagnac ring having two branches, and two light splitters. The optical elements are placed so that, a first portion of the light emitted by the source can pass in succession through the first splitter, through the filter, and through the second splitter. The light enters the first branch of the ring and emerges via the second branch of the ring. The light passes through the second splitter, and through the filter and through the first splitter and arrives at the detector. A second portion of the light emitted by the source can pass in succession through the first splitter, to the filter, and through the second splitter. The light enters via the second branch of the ring and emerges via the first branch of the ring. The light passes through the second splitter and through the filter and through the first splitter and arrives at the detector. The optical elements are structured and placed in such a way that the light is polarized light, that emanates from the source and arrives at the second splitter before having passed into the Sagnac ring. The second splitter is a polarization splitter that splits, completely or partly, the incident light into two defined polarizations. The polarization state of the light arriving at the first splitter coming from the source is a combination of the two defined polarizations. The ring is structured so that light entering via one of the branches, being polarized in one of the defined polarizations, emerges via the other branch having a substantially nonzero power in the other defined polarization. The measurement device does not include a polarizer in the light path running from the second splitter to the detector. The detector includes a system for analyzing the polarization state of the light signal formed by the superposition of the first and second portions of the light arriving at the detector.

BRIEF DESCRIPTION OF THE DRAWINGS

The invention will be more clearly understood and other features and advantages will become apparent from the description below and from the appended drawings, given by way of examples, in which:

FIG. 1 shows schematically an example of a fiber-optic gyrometer according to the prior art;

FIG. 2 shows schematically an example of a fiber-optic gyrometer according to the invention;

DETAILED DESCRIPTION OF THE INVENTION

Figure 3:
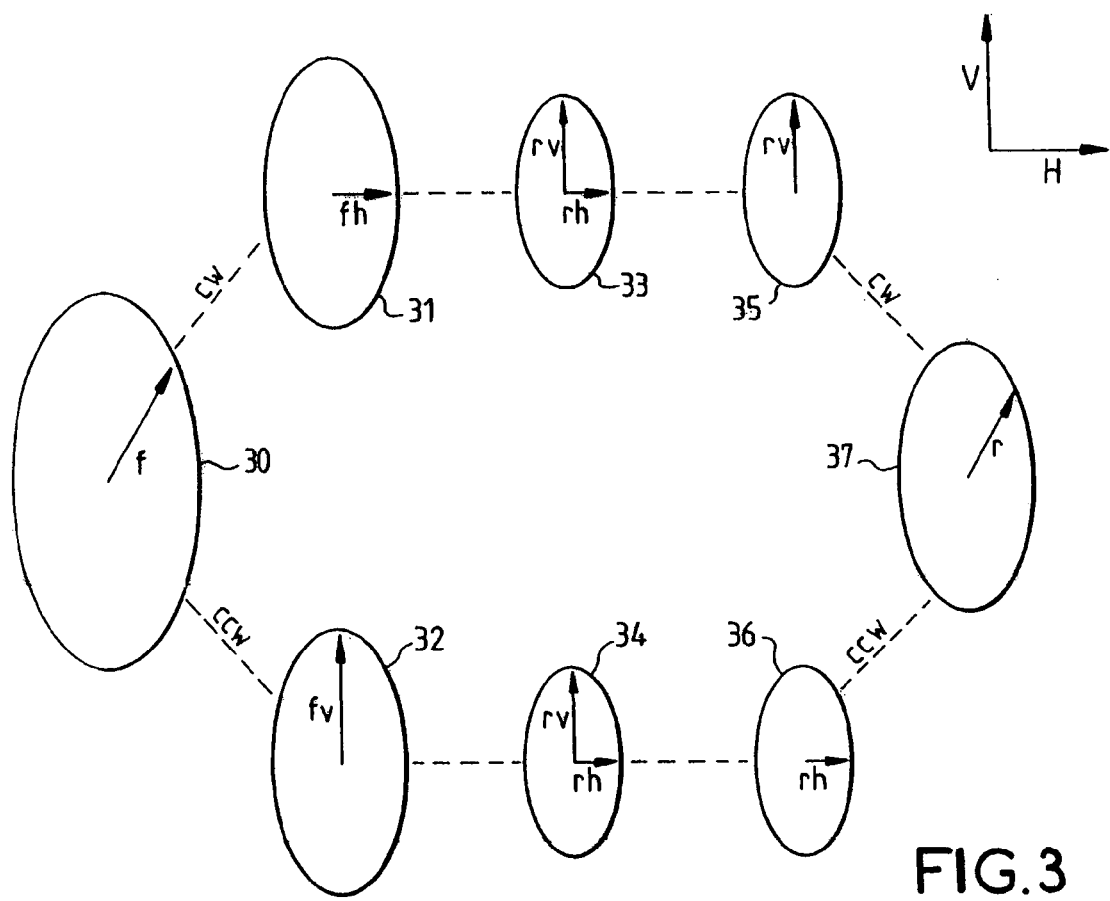
FIGS. 3 and 4 show schematically examples of diagrams that explain the operating principle of a fiber-optic gyrometer according to the invention.

The device for measuring a nonreciprocal effect according to the invention is preferably a fiber-optic gyrometer. This fiber-optic gyrometer is advantageously used in an aeronautical gyroscope. This aeronautical gyroscope therefore preferably constitutes the secondary gyroscope or one of the secondary gyroscopes of the aircraft. The presence of one or more secondary gyroscopes constitutes a safety measure on aircraft, especially should the main gyroscope fail. The measuring device according to the invention may also be especially a magnetometer, advantageously a fiber-optic magnetometer, making it possible to detect and measure the Faraday effect induced in the optical fiber by an electric current flowing near the optical fiber. Throughout the rest of the text, unless otherwise mentioned, the device for measuring a nonreciprocal effect that will be considered will be a gyrometer, this gyrometer advantageously being a fiber-optic gyrometer. The additional features described in the rest of the text may nevertheless apply also to devices other than a fiber-optic gyrometer, measuring nonreciprocal effects other than the Sagnac effect caused by the speed of rotation to which the measuring device is subjected; among these other effects, there are in particular the magnetooptic effects induced in a loop.

FIG. 2 shows schematically an example of a fiber-optic gyrometer according to the invention. The path of the light beams is indicated in FIG. 2 by means of arrows. The fiber-optic gyrometer comprises in particular the following elements: a light source 1; a polarizer 51; a light detector 3; a first light splitter 4; a nonpolarizing monomode spatial filter 52; a second light splitter 7, which is a polarization splitter; and a Sagnac ring 8 having two branches 81 and 82.

The light source 1 emits light advantageously in the form of a light beam. This light beam may be a laser beam or else is preferably a light beam output by an incoherent source of very great luminance, such as a superluminescent diode. This light beam arrives polarized at a first light splitter 4. To do this, either the source 1 emits polarized light directly, or a polarizer 51 is placed between the source 1 and the first splitter 4.

Firstly, this light splitter 4 is structured so that a substantial portion of the light coming from the source 1 passes through the first splitter 4 so as to undergo the Sagnac effect while it passes through the Sagnac ring 8. Secondly, this light splitter 4 is structured so that a substantial portion of the light that has passed through the Sagnac ring 8 is reflected by the first splitter 4 onto the detector 3 so as to be analyzed by the detector 3. Since the propagation between the various optical components is shown in FIG. 2 as propagation in free mode, the first splitter 4 is of the partially reflecting plate type. However, in the case of an all-fiber-optic gyrometer, this first splitter 4 would, for example, be an optical fiber coupler.

Likewise, FIG. 2 includes lenses L for passing from free propagation to propagation guided by an optical fiber, but in the case of an all-fiber gyrometer or else an integrated-optics gyrometer, these lenses L would become superfluous. These lenses L are presented at each change between free propagation mode, on the one hand, and fiber-optic guided mode on the other. There is one of them between the first splitter 4 and the monomode spatial filter 52, one between the monomode spatial filter 52 and the second splitter 7 and one between the second splitter 7 and each of the branches 81 and 82 of the Sagnac ring 8. Each lens L may possibly be replaced with a combination of lenses. The lenses L will be practically mentioned no more in the rest of the description of FIG. 2.

The light beam then passes through the nonpolarizing monomode spatial filter 52. On leaving the monomode spatial filter 52, the light beam now consists substantially of only a single spatial mode, but not necessarily having a single linear polarization: it is only in the case of zero rotation speed that this single spatial mode comprises only one linear polarization corresponding in general to the polarization of the light emitted by the source 1. Advantageously, the monomode spatial filter 52 is a section of axisymmetric monomode optical fiber.

On leaving the monomode spatial filter 52, the light beam arrives at a second light splitter 7, which is a polarization splitter. The second light splitter 7 may be a total or partial polarization splitter. Preferably, the second light splitter 7 is a total polarization splitter, that is to say it sends one of the defined polarizations constituting the light beam into one of the branches, for example the branch 81, while at the same time it sends, into the other branch, for example the branch 82, the polarization complementary to that sent into the first branch, in this case the branch 81. The splitter 7 is a total splitter insofar as each polarization is completely separated from the complementary polarization. The splitter 7 is, for example, a Wollaston prism.

Preferably, the Sagnac ring 8 is a reel of optical fiber. The direction of circulation of the light from the branch 81 toward the branch 82 is called cw (standing for clockwise) and the direction of circulation from the branch 82 toward the branch 81 is called ccw (standing for counterclockwise). To avoid any fading of the light signal circulating in the Sagnac ring 8, the Sagnac ring 8 is structured so that light entering, via one of the branches, polarized in one of the defined polarizations emerges via the other branch with substantially nonzero power in the other defined polarization. Substantially nonzero power, corresponding to a signal that has not faded, is power sufficient for the light arriving at the detector 3 to be exploited. To do this, as will be explained later, one of the branches of the Sagnac ring 8, for example the branch 82, advantageously includes a Lyot depolarizer 10.

After having emerged from the Sagnac ring 8, the two portions of the light beam pass through the second splitter 7, only partly, to be superposed as a light beam that then passes via, that is to say in this case through, the monomode spatial filter 52. On leaving the monomode spatial filter 52, the monomode light beam arrives at the first light splitter 4, the other modes having been filtered. One portion of this light beam is reflected by the first splitter 4 toward the detector 3. The polarization state of the light beam reflected by the first splitter 4 toward the detector 3 is representative of the Sagnac effect, and therefore of the speed of rotation to which the fiber-optic gyrometer is subjected. This is why the detector 3 includes a system for analyzing the polarization state of the light beam arriving at this same detector 3.

A first portion of the light beam emitted by the source 1 passes in succession through the first splitter 4, through the monomode spatial filter 52 and through the polarization splitter 7, enters the Sagnac ring 8 via the branch 81 thereof before emerging from the Sagnac ring 8 via the branch 82, passes back through the polarization splitter 7, through the monomode spatial filter 52 and through the first splitter 4 and arrives at the detector 3. Moreover, a second portion of the light beam emitted by the source 1 passes in succession through the first splitter 4, through the monomode spatial filter 52 and through the polarization splitter 7, enters the Sagnac ring 8 via the branch 82 thereof before emerging from the Sagnac ring 8 via the branch 81, passes through the polarization splitter 7, through the monomode spatial filter 52 and through the first splitter 4 and arrives at the detector 3. The light beam output by the source 1 and arriving at the polarization splitter 7, before being passed into the Sagnac ring 8, is a polarized light beam that had been polarized upon its passing through the polarizer 51.

The polarization splitter 7 splits, totally or partly, but preferably totally, the incident light into two defined polarizations. The polarization splitter 7 is advantageously a linear polarization splitter that splits, for example, the horizontal and vertical polarizations of a light beam preferably polarized at 45 degrees by the polarizer 51. The light beam, on arriving at the polarization splitter 7, is made up of, each with one half of its energy, a horizontally polarized component and a vertically polarized component. The polarization splitter 7 may also be a circular polarization splitter, that then splits the left circular and right circular polarizations of a light beam having these two polarizations advantageously in approximately equal energy proportions. Any possible fading of the signal in the Sagnac ring 8 is prevented by means of the Lyot depolarizer. Since the polarizer 51 is located upstream of the first splitter 4, the fiber-optic gyrometer includes no polarizer in the light path going from the polarization splitter 7 to the detector 3. The detector 3 includes a system for analyzing the polarization state of the light beam that arrives at the detector 3 and that is formed by the superposition of the first and second portions of the light beam that were described above. The state of polarization of this light beam arriving at the detector 3 is representative of the Sagnac effect, and therefore of the speed of rotation to which the fiber-optic gyrometer is subjected.

Instead of having a monomode spatial filter 52 placed between the first splitter 4 and the polarization splitter 7, the measuring device according to the invention could have either two monomode spatial filters placed respectively, on the one hand, between the source 1 and the first splitter 4 and, on the other hand, between the first splitter 4 and the detector 3, but the constraints on the separation between the respective alignments of each monomode spatial filter and of the two branch entrances of the Sagnac ring 8 with respect to the path of the light beam would be more severe, or two monomode spatial filters placed respectively, on the one hand, between the polarization splitter 7 and the branch 81 and, on the other hand, between the polarization splitter 7 and the branch 82, but the signal then arriving at the detector 3 is less easily exploitable.

By means of the polarization splitter 7, which is preferably a total polarization splitter, one of the polarizations, for example the horizontal polarization, is sent into one of the branches of the Sagnac ring 8, for example the branch 81, whereas the other polarization, that is to say the complementary polarization, in this case the vertical polarization, is sent into the other branch of the Sagnac ring 8, in this case the branch 82. The light, having passed back through the polarization splitter 7 after passing through the Sagnac ring 8, has a reciprocal component and a nonreciprocal component representative of the nonreciprocal effect to be measured. In the preferred case in which the light beam arriving at the polarization splitter 7 is light polarized at 45 degrees, that is to say light whose components along the horizontal and vertical polarizations respectively are of equal intensity, the nonreciprocal component is found in the same optical channel as the reciprocal component, that is to say it also ends up, like the reciprocal component, at the detector 3, but in a polarization orthogonal to that of the reciprocal component.

Figure 4:
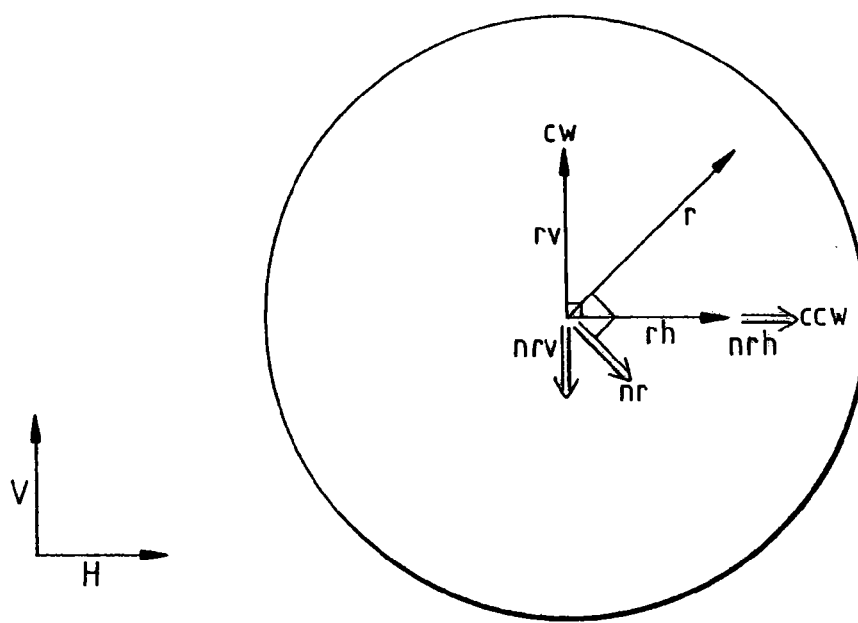

More precisely, FIGS. 3 and 4 show schematically examples of diagrams that explain the operating principle of a fiber-optic gyrometer according to the invention, corresponding to the preferred case of light polarized at 45 degrees when it arrives at the polarization splitter 7 before passing through the Sagnac ring 8. In these examples, the Sagnac ring 8 is considered as including a Lyot depolarizer 10 at one of its branches. The axes H and V represent the horizontal and vertical polarizations, respectively.

FIG. 3 enables to precise the progress of the reciprocal component of the light beam arriving at the polarization splitter 7, passing through the polarization splitter 7 that splits it into two components, horizontal and vertical respectively, each of the two components being subjected to the action of the Lyot depolarizer 10 during its passage through the Sagnac ring 8, and passing back through the polarization splitter 7, the two components combining at the exit of the polarization splitter 7 after having passed through the Sagnac ring 8. When describing the progress of the light beam, the losses, especially absorption losses, will be disregarded.

When it arrives at the polarization splitter 7, the light beam is polarized at 45 degrees, the polarization state of the light beam f being shown at 30. The light beam f is split by the polarization splitter 7 into its two components, on the one hand, the horizontal component fh, which is sent into the branch 81 in order to travel through the Sagnac ring 8 in the cw direction, shown at 31, and on the other hand the vertical component fv which is sent into the branch 82, in order to travel through the Sagnac ring 8 in the ccw direction, which is shown at 32. In the rest of the text, unless otherwise mentioned, the light beam traveling along the Sagnac ring 8 in the cw direction will, for the sake of simplicity, be called the cw beam and the light beam traveling along the Sagnac ring 8 in the ccw direction will, for the sake of simplicity, be called the ccw beam. The nonreciprocal components of the cw and ccw light beams are not considered in FIG. 3 for the sake of simplicity—they will be considered in FIG. 4.

During its passage through the Lyot depolarizer 10, the energy of the cw light beam is divided along two polarization components—a horizontal polarization component rh and a vertical polarization component rv—these components being shown at 33. Upon passing through the polarizaton splitter 7, only the vertical polarization component rv of the cw light beam, shown at 35, is sent back toward the monomode spatial filter 52.

On passing through the Lyot depolarizer 10, the energy of the ccw light beam is divided into two polarization components—a horizontal polarization component rh and a vertical polarization component rv—these components being shown at 34. Upon passing through the polarization splitter 7, only the horizontal polarization component rh of the ccw light beam, shown at 36, is sent back toward the monomode spatial filter 52.

On leaving the polarization splitter 7, the light beam going back toward the monomode spatial filter 52 is formed from the recombination, on the one hand, of the vertical polarization component rv of the cw light beam and, on the other hand, the horizontal polarization component rh of the ccw light beam. This light beam r constitutes the reciprocal component r of the total light beam returning toward the monomode spatial filter 52 and is shown at 37.

FIG. 4 shows in one plane, the plane of FIG. 4, both the reciprocal component r and the nonreciprocal component nr of the total light beam returning toward the monomode spatial filter 52. However, the reciprocal component r and the reciprocal component nr are phase-shifted by $\pi/2$—strictly speaking they are therefore not in the same phase plane. The reciprocal component r and its horizontal polarization component rh and vertical polarization component rv, all lying in a phase plane $\phi=0$, are shown by single-shafted arrows, while the nonreciprocal component nr and its horizontal polarization component nrh and vertical polarization component nrv, all lying in another phase plane $\phi=\pi/2$, are shown by double-shafted arrows. For one of the directions of circulation of the beam, for example the ccw direction, the horizontal polarization component rh of the reciprocal component r gives rise to a horizontal polarization component nrh of the nonreciprocal component nr, phase-shifted by $\pi/2$ with respect to the nonreciprocal component nr, but in the same direction as the latter. For the other direction of circulation of the beam, in this case the cw direction, the vertical polarization component rv of the reciprocal component r gives rise to a vertical polarization component nrv of the nonreciprocal component nr, phase-shifted by $\pi/2$ with respect to the nonreciprocal component nr but in the opposite direction to the latter. Since the reciprocal component r is at 45 degrees, the nonreciprocal component nr is therefore orthogonal to it. Thus, the ellipticity of the total light beam returning toward the monomode spatial filter 52 is representative of the nonreciprocal effect to be measured, namely the Sagnac effect, just like the ellipticity of the light beam arriving at the detector 3. The operation described above corresponds to the case of a total polarization splitter 7 and of light coming from the source 1 that is polarized at 45 degrees when it arrives at the polarization splitter 7 before it passes through the Sagnac ring 8. The operation remains similar for other types of polarization of the light emitted by the source 1 and/or other types of polarization splitters 7, especially those described later.

It is possible for the polarization splitter 7 not to be a total polarization splitter but only a partial polarization splitter. In this case, the polarization splitter partly splits the incident light into the two defined polarizations. The main fraction of the incident light that represents the larger fraction of the incident light, which corresponds to complementary polarizations split from each other by the polarization splitter 7, which is passed through the Sagnac ring 8 and then once again through the polarization splitter 7, is called the main component. The main component comprising a reciprocal component and a nonreciprocal component representative of the nonreciprocal effect to be measured. The residual fraction of the incident light, that represents the smaller portion of the incident light, which corresponds to the polarization or polarizations that have not been split from their respective complementary polarization by the polarization splitter, which is passed through the Sagnac ring and then through the polarization splitter, is called the parasitic component or components. The parasitic component or components also comprise a reciprocal portion and a nonreciprocal portion, but this is of no interest. In this case, all the phase shifts, between the parasitic component or components and the main component, said phase shifts being defined relative to the overall main component since the phase shift between the reciprocal component and the nonreciprocal component is negligible compared with said phase shifts, are preferably greater than the inverse of the spectral width of the light source so that the parasitic component or components do not interfere with the main component. Advantageously, said phase shifts are greater than the inverse of the spectral width of the light source by a factor of at least a few units.

This is because, if the polarization splitter 7 is only a partial splitter, one portion of one of the defined polarizations that circulated, in the preferred case of a total polarization splitter 7, in one of the directions of travel through the Sagnac ring 8, circulates, in contrast, in the case of a partial polarization splitter 7, in the other direction of travel through the Sagnac ring, therefore being superposed on the other defined polarization. For example, let us take the case in which most of the horizontal polarization is sent via the polarization splitter 7 into the branch 81 of the Sagnac ring 8, in order to travel through it in the cw direction, and in which most of the vertical polarization is sent via the polarization splitter 7 into the branch 82 of the Sagnac ring 8, in order to travel through it in the ccw direction. Since the polarization splitter 7 is only a partial splitter, for example a portion of the vertical polarization, called parasitic or residual light, is sent into the branch 82 in order to travel through the Sagnac ring 8 in the cw direction with most of the horizontal polarization, called the main light (this is in fact that portion of the main component that circulates in the cw direction). It would also be possible to consider a portion of the horizontal polarization sent into the branch 81 in order to travel through the Sagnac ring 8 in the ccw direction with most of the vertical polarization.

When passing through birefringent elements, such as for example a monomode optical fiber, a polarization-maintaining optical fiber or a Lyot depolarizer, a given spectral component of the parasitic light propagates while remaining orthogonal to the same given spectral component of the main light. The relative phase between these two given spectral components may have any value at their respective exit from the Sagnac ring 8 and the interference that these two given spectral components will generate, when they are superposed after passing through the partial polarization splitter 7, may be arbitrarily constructive or destructive. In addition, this relative phase is dependent on the spectral component in question. One way of making this interference inoperative is to prevent the two spectral components from interfering with each other, by sufficiently retarding one of them relative to the other, for example by sufficiently retarding the parasitic light with respect to the main light. Thus, the light signal arriving at the detector 3 will nevertheless be able to be exploited, it not having been degraded by the interference between main light and parasitic light. To achieve this, the abovementioned phase shifts must meet the condition of being sufficiently greater than the inverse of the spectral width of the light source 1. To meet this condition, the sum of the optical path differences between the main light and the parasitic light that are due to the various birefringences encountered by the light along its path is advantageously chosen to be sufficiently larger than the coherence length of the light source 1. This is expressed by the following equation:

$$\sum_{e} (\Delta n, e) \gg \frac{\lambda^2}{\Delta \lambda};$$

where Δn is the birefringence of each path portion e traveled by the light, $$\sum_{e}$$

symbolizing the sum over all of the path portions e, λ is the mean wavelength of the light spectrum emitted by the light source 1 and, Δλ/λ then represents the spectral width of the light beam emitted by the light source 1. If the above condition is not met, it becomes more difficult, if not impossible, to measure the nonreciprocal effect.

If the polarization splitter 7 is a total splitter, but the polarized light output by the light source 1 is not polarized at 45 degrees, let α be the difference between the polarization angle of this polarized light and 45 degrees—this angle α is taken into account at the detector 3. For example, for low-cost and less accurate gyrometers operating in open loop, using a short length of optical fiber in the Sagnac ring 8, said gyrometers being intended to measure low rotation speeds, the signal received by the detector 3 can be exploited in a similar manner, to within a simple cos α factor that reduces the ellipticity measured by the detector 3 in the case of the light beam that it receives.

In the preferred embodiment of the invention, the polarization splitter 7 is a total splitter, that is to say it totally splits the incident light into the two defined polarizations, so as to prevent the formation of a sufficient amount of parasitic light whose interference with the main light would substantially degrade the signal received by the detector 3, so as therefore to prevent extraction of the nonreciprocal component representative of the nonreciprocal effect to be measured by the measuring device according to the invention. Preferably, the polarized light output by the light source 1 and arriving at the polarization splitter 7 is light polarized approximately at 45 degrees so that the light energy circulating in each of the cw and ccw directions in the Sagnac ring 8 is approximately the same.

The polarization splitter 7 therefore splits, partly or preferably totally, two complementary polarizations. These two complementary polarizations may be a left circular polarization and a right circular polarization, respectively. These two complementary polarizations may also be a given elliptical polarization and an elliptical polarization orthogonal to the given elliptical polarization, respectively. These two complementary polarizations are preferably a given linear polarization, for example a horizontal polarization, and a linear polarization orthogonal to the given polarization, for example a vertical polarization. The polarization splitter 7 is then a linear polarization splitter. The light source 1 then advantageously emits light polarized approximately at 45 degrees to the axes of the polarization splitter 7. The preferably total polarization splitter 7 is, for example, a Wollaston prism.

In order for the signal arriving at the detector 3 to be able to be exploited, the light beam arriving at the detector 3 and conveying this signal corresponds to a single spatial mode having a certain polarization state that is representative of the nonreciprocal effect to be measured. The monomode spatial filter 52 is preferably a length of axisymmetric monomode optical fiber that lets through only a single spatial mode but lets through both the horizontal and vertical polarization components of this spatial mode. Preferably, the monomode spatial filter 52 introduces no substantial birefringence, even if this birefringence has only little influence on the signal arriving at the detector 3 insofar as this birefringence has no first-order effect on this signal.

According to an embodiment of the measuring device according to the invention, the Sagnac ring 8 is a polarization-maintaining optical fiber structured so that, from one branch to the other, the light in one of the defined polarizations is converted into light in the other, complementary defined polarization. The means of converting the polarization is, for example, a simple twist in the optical fiber or else a few bends in the optical fiber. For example, the horizontally polarized light entering the Sagnac ring 8 via the branch 81 emerges therefrom via the branch 82, being vertically polarized, and the vertically polarized light entering the Sagnac ring 8 via the branch 82 emerges therefrom via the branch 81, being horizontally polarized. This arrangement prevents any fading of the signal thanks to the presence of the polarization-maintaining optical fiber in which the signal cannot switch from one polarization to the other during its propagation along the Sagnac ring 8, since the respective velocities of propagation of the various polarizations in the polarization-maintaining fiber are different.

According to another preferred embodiment of the measuring device according to the invention, one of the branches of the Sagnac ring 8 includes a Lyot depolarizer 10. In this case, the optical fiber constituting the Sagnac ring 8 may be an ordinary optical fiber. The presence of the Lyot depolarizer ensures that the light, on leaving each branch of the Sagnac ring 8, is substantially divided partly, and advantageously half, into the horizontal polarization, that is to say into a horizontal polarization component, and partly, and advantageously half, into the vertical polarization, that is to say into a vertical polarization component. With an ordinary optical fiber and without any element of the Lyot depolarizer 10 type, there is, in certain cases, a risk of total fading of the signal if this signal has completely switched from one polarization to the other since, after having passed through the polarization splitter 7, no signal is then sent back toward the monomode spatial filter 52 and therefore to the detector 3. Only such complete switching of one polarization to the other is truly problematic, since in the case of only partial switching the signal still exists but with a lower intensity, which may reduce the sensitivity of the device. This complete switching from one polarization to the other may occur under certain temperature or pressure variation conditions on the ordinary optical fiber constituting the Sagnac ring 8. Even though on average, with this other preferred embodiment, about one half of the energy is lost on passing through the polarization splitter 7 after having passed through the Sagnac ring 8, unlike the previous embodiment with a polarization-maintaining fiber in which most of the energy passes back through the polarization splitter 7 toward the detector 3, it is possible to use an ordinary optical fiber instead of a polarization-maintaining optical fiber, which is appreciable. Other devices having the same function as the Lyot depolarizer 10 may be envisioned.

Preferably, the first splitter 4 is a partial polarization splitter structured so as to increase, as regards the polarization state of the light signal arriving at the detector 3, the ratio of the polarization complementary to the polarization emitted by the source to the polarization emitted by the source. Partial polarization splitters are known in the field of magnetooptic detection. The use of such a first partial polarization splitter 4 has two advantages. The first advantage is that, along the outward path, that is to say along the path going from the light source 1 to the Sagnac ring 8, most of the light passes through the first partial polarization splitter 4 in order to continue toward the Sagnac ring 8, and not only half as in the case of a semireflecting plate constituting the first splitter 4. The second advantage is that, along the return path, that is to say on the path going from the Sagnac ring 8 toward the detector 3, a substantial portion of the light returning to the first partial polarization splitter 4 and being in the polarization emitted by the source 1 is sent back in a direction that is not that of the detector 3, whereas the light returning to the first partial polarization splitter 4 and being in the polarization complementary to the polarization emitted by the source 1, that is to say representative of the nonreciprocal effect, is mostly sent back toward the detector 3. The ellipticity of the light beam arriving at the detector 3 is appreciably amplified thereat, for example by a factor of three, as shown in FIGS. 5 and 6.

Figure 5:
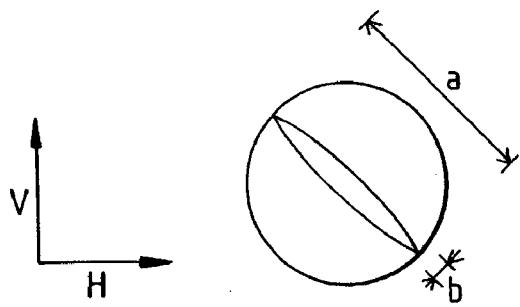
FIGS. 5 and 6 show schematically examples of diagrams that explain the operating principle of a partial polarization splitter used as first light splitter in the fiber-optic gyrometer according to the invention.
Figure 6:
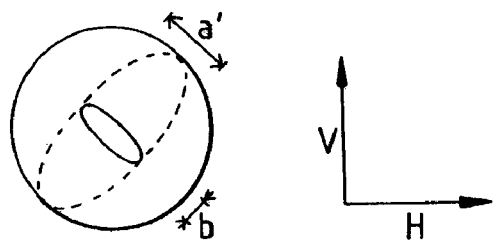

FIGS. 5 and 6 show schematically examples of diagrams that explain the operating principle of a partial polarization splitter used as first light splitter 4 in the fiber-optic gyrometer according to the invention. The axes H and V represent the horizontal and vertical polarizations, respectively. After having passed through the Sagnac ring 8 and arriving at the first partial polarization splitter 4, the light beam has an elliptical polarization state, the value a of the major axis of which is representative of the reciprocal component whereas the value b of the minor axis is representative of the noreciprocal component. The ellipticity of this polarization state shown in FIG. 5 is b/a. In the case in which the light beam is passed through a first partial polarization splitter 4 and when the light beam arrives at the detector 3, the light beam has an elliptical polarization state, the value a' of the major axis of which is representative of the reciprocal component whereas the value b of the minor axis of which is representative of the nonreciprocal component. Since the value a' is less than the value a, the ellipticity of this polarization state shown in FIG. 6 is b/a' and is therefore larger, which makes said ellipticity more easily detectable by the system that the detector 3 has for analyzing the polarization state.

The system that the detector 3 has for analyzing the polarization state is preferably a system for analyzing the ellipticity of the light beam arriving at the detector 3 in the preferred case in which the polarization splitter 7 is a linear polarization splitter.

The detector 3 preferably comprises a time-variable quarterwave plate, the birefringence axes of which are fixed, one of the birefringence axes of which is parallel to the polarization emitted by the source and each of the birefringence axes of which becomes alternately slow and fast. The direction of the ellipticity of the polarization state of the light beam arriving at the detector 3, representative of the nonreciprocal effect to be measured in general and of the direction of rotation in the case of a fiber-optic gyrometer in particular, may be determined in this way. Such a detection chain, that the detector 3 includes, is insensitive or only slightly sensitive to the misalignments of the various elements making up the chain and to the electronic imbalances arising from the electronic elements that it contains. Preferably, the quarterwave plate is an elastooptic modulator. This elastooptic modulator is, for example, formed by an isotropic medium of the glass or plastic type, compressed by piezoelectric elements. A compressive force of a few kilograms per millimeter may then be sufficient to create a birefringence of 90 degrees.

According to one embodiment of the detector 3 of the measuring device according to the invention, the detector 3 comprises in succession, downstream of the quarterwave plate, an analyzer, that is to say one whose axes are at 45 degrees to the axes of the quarterwave plate, a photoelectric elementary detector that receives one of the components of the light signal analyzed and synchronous detection means that perform, at the output of the photoelectric elementary detector, the subtraction between the series of high values of the signal and the series of low values of the signal, the pairwise subtracted values being, on the one hand, one high and the other low and, on the other hand, mutually contiguous, the mean value of the results of the subtraction being representative of the nonreciprocal effect.

According to another preferred embodiment of the detector 3 of the measuring device according to the invention, the detector 3 comprises in succession, downstream of the quarterwave plate, an analyzer at 45 degrees to the quarterwave plate, two photoelectric elementary detectors, each receiving one of the components of the light signal analyzed, a differential amplifier that can perform the subtraction between the two signals, output by the photoelectric elementary detectors respectively, and synchronous detection means that perform, at the output of the differential amplifier, the subtraction between the series of high values of the signal and the series of low values of the signal, the pairwise subtracted values being, on the one hand, one high and the other low and, on the other hand, mutually contiguous, the mean value of the results of the subtraction being representative of the nonreciprocal effect. The bias possibly introduced by the use of a differential amplifier is eliminated by using synchronous detection means. The use of two photoelectric elementary detectors is advantageous insofar as it allows the signal-to-noise ratio to be increased.

Preferably, the detector 3 comprises, immediately upstream of the synchronous detection means, means for digitizing the electrical signal, thereby preventing the introduction of bias at the synchronous detection means, detection taking place digitally.

Figure 7:
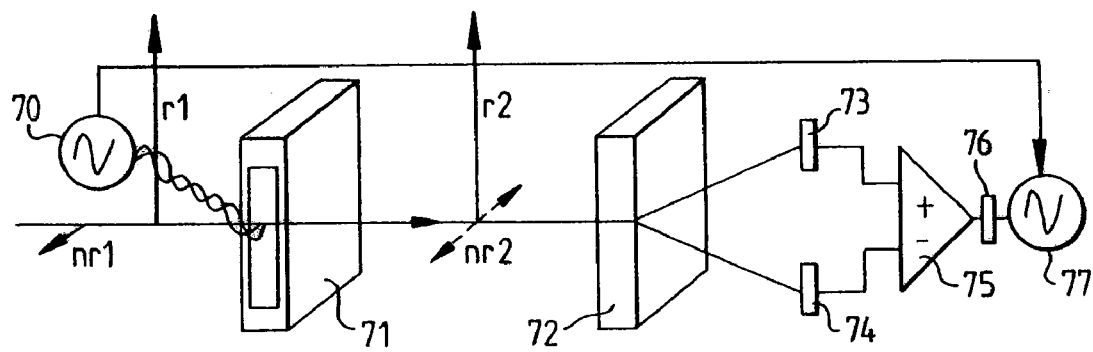
FIG. 7 shows schematically an example of a detector used in a fiber-optic gyrometer according to the invention.

FIG. 7 shows schematically an example of a detector 3 used in a fiber-optic gyrometer according to the invention, corresponding to the other preferred embodiment of the detector 3. After having passed through the first light splitter 4 and having been sent back toward the detector 3 shown in its entirety in FIG. 7, the light beam has a polarization state consisting of a reciprocal component r1 and a nonreciprocal component nr1 phase-shifted by $\pi/2$ with respect to the reciprocal component r1, in the preferred case of a total polarization splitter 7 and of light polarized at 45 degrees when it arrives at the total polarization splitter 7 before passing through the Sagnac ring 8. The light beam passes through an elastooptic modulator 71 driven by drive means 70. After it has passed through the elastooptic modulator 71, the polarization state of the light beam consists of a reciprocal component r2 parallel to the reciprocal component r1 and of a nonreciprocal component nr2 parallel to the nonreciprocal component nr1. The reciprocal component r2 and the nonreciprocal componnent nr2 are now in phase, since their phase shift has been eliminated by the elastooptic modulator 71 that has alternately delayed and advanced the nonreciprocal component relative to the reciprocal component, since the axes of the modulator 71 are parallel to the axes of the elllipse constituting the elliptical polarization state of the light beam before it passes through the modulator 71. Thus, the elliptical polarization state becomes a polarization state that oscillates alternately between two linear polarizations having the same reciprocal component but nonreciprocal components of opposite sign. The value of this oscillation is therefore representative of the ellipticity of the light beam arriving at the detector 3 and consequently of the nonreciprocal effect to be measured. The light beam then passes through an analyzer 72 at 45 degrees to the modulator 71. The projections of the above oscillation on each of the axes of the analyzer 72 are representative of the nonreciprocal effect to be measured. These projections constitute light signals sent to the photoelectric elementary detectors 73 and 74, respectively. Each of the electrical signals at the output of the elementary detectors 73 and 74 is representative of the nonreciprocal effect to be measured. A differential amplifier takes the difference between these two electrical signals so as to largely eliminate the noise of the light source 1. This difference is representative of the nonreciprocal effect to be measured. This difference represents an electrical signal that is digitized by digitizing means 76. Synchronous detection means 77, synchronized with the means 70 driving the modulator 71, perform, at the output of the digitizing means 76, the subtraction between the series of high values of the digitized signal and the series of low values of the digitized signal. The pairwise subtracted values are, on the one hand, one high and the other low and, on the other hand, mutually contiguous, that is to say that the subtraction is performed, for example, between the first high value and the first low value, then between the second high value and the second low value, and so on. The mean value of the results of this subtraction is representative of the nonreciprocal effect to be measured.

The invention claimed is:

1. A device for measuring a nonreciprocal effect, comprising optical components including:
   a light source;
   a first light splitter;
   a Sagnac ring having a first and a second branches:
   a second light splitter that divides an incident light into said first and second branches of the Sagnac ring;
   a nonpolarizing monomode spatial filter located between said first light splitter and said second light splitter;
   a light detector;
   said optical elements being so structured and arranged so that
   an incident light arriving at the first splitter and coming from the light source has a polarization state which is a combination of defined polarizations,
   said second splitter is a polarization splitter, to completely or partly split said incident light into a first and a second defined polarizations, a first portion of the light emitted by said light source can pass in succession through the first splitter, through the spatial filter, through the second splitter, to enter the first branch of the Sagnac ring and emerge via the second branch of the Sagnac ring, pass through the second splitter, through the spatial filter and through the first splitter and arrive at the light detector,
   a second portion of the light emitted by said light source can pass in succession through the first splitter, to the spatial filter, through the second splitter, to enter via the second branch of the Sagnac ring and emerge via the first branch of the Sagnac ring, pass through the second splitter, through the spatial filter and through the first splitter and arrive at the detector;
   wherein said first splitter is a partial polarization splitter structured so as to increase, as regards the polarization state of the light signal arriving at the light detector, the ratio of the polarization complementary to the polarization emitted by the source to the polarization emitted by the source and
   said light detector including a system for analyzing the polarization state of a light signal formed by the superposition of the first and second portions of the light arriving at the light detector.

2. The measuring device as claimed in claim 1, wherein the Sagnac ring is structured so that light entering via one of said first and second branches being polarized in one of said first and second polarizations emerges via the other branch having a substantially nodzero power in the other defined polarization.

3. The measuring device as claimed in claim 1, wherein the monomode spatial filter is a section of axisymmetric monomode optical fiber.

4. The measuring device as claimed in claim 1, wherein the sagnac ring is a reel of optical fiber.

5. The measuring device as claimed in claim 4, wherein one of the first and second branches of the sagnac ring includes a Lyot depolarizer.

6. The measuring device as claimed in claim 4, wherein the sagnac ring is a polarization-maintaining optical fiber structured so that, from one branch to the other, the light in one of the defined polarizations is converted into light in the other, complementary, defined polarization.

7. The measuring device as claimed in claim 1, wherein the second splitter is a partial splitter, and wherein:
   a main fraction of an incident light which corresponds to the complementary defined polarizations split from each other by the second splitter, said main fraction of the light which is passed by the sagnac ring and then by the polarization splitter, being called a main component;
   a residual fraction of the incident light which corresponds to the polarization or polarizations not being split by the second splitter from a complementary polarization, said residual fraction of the incident light, which is passed by the sagnac ring and then by the polarization splitter, being called a parasitic component or components, and wherein all phase shifts, between the parasitic component or components and the main component, are greater than the inverse of a spectral width of the light source so that the parasitic component or components do not interfere with the main component.

8. The measuring device as claimed in claim 1, wherein the second splitter is a linear polarization splitter.

9. The measuring device as claimed in claim 1, wherein the second splitter completely splits the incident light into the two defined polarizations.

10. The measuring device as claimed in claim 9, wherein the second splitter is a Wollaston prism.

11. The measuring device as claimed in claim 9, wherein the light source emits light polarized at approximately 45 degrees to the axis of the second splitter.

12. The measuring device as claimed in claim 1, wherein the system for analyzing the polarization state is a system for analyzing the ellipticity of a light beam arriving at the detector.

13. The measuring device as claimed in claim 1, wherein the light detector comprises a time-variable quarterwave plate, the birefringence axes of which are fixed, one of the birefringence axes of which is parallel to the polarization emitted by the light source and each of the birefringence axes of which becomes slow or fast alternately.

14. The measuring device as claimed in claim 13, wherein the quarterwave plate is an elasto-optic modulator.

15. The measuring device as claimed in claim 13, wherein the light detector comprises, in succession, downstream of the quarterwave plate, an analyzer at 45 degrees to the quarterwave plate, a photoelectric elementary detector having an output, and synchronous detection means, wherein said photoelectric elementary detector receives one of the components of the light signal arriving at the light detector, and said synchronous detection means performs, at the output of the photoelectric elementary detector, a subtraction between a series of high values of the light signal and a series of low values of the light signal, the pairwise subtracted values being, on the one hand, one high and the other low and, on the other hand, mutually contiguous, a mean value of the results of the subtraction being representative of the nonreciprocal effect.

16. The measuring device as claimed in 15, wherein said light detector comprises, in succession, downstream of the quarterwave plate, an analyzer at 45 degrees to the quarterwave plate and two photoelectric elementary detectors that each receives one of the components of the light signal,
   a differential amplifier performing the subtraction between the two signals output by the photoelectric elementary detectors respectively,
   synchronous detection means performing, at the output of the differential amplifier, the subtraction between a series of high signal values and a series of low signal values, the pairwise subtracted values being, on the one hand, one high and the other low and, on the other hand, mutually contiguous, a mean value of the results of the subtraction being representative of the nonreciprocal effect.

17. The measuring device as claimed in claim 15, wherein the detector includes, immediately upstream of the synchronous detection means, means for digitizing the electrical signal.

18. The measuring device as claimed in claim 1, wherein the measuring device is a fiber-optic gyrometer.

19. An aeronautical gyroscope comprising a fiber-optic gyrometer as claimed in claim 18.

20. The measuring device as claimed in claim 1, wherein the measuring device is a fiber-optic magnetometer.

21. The measuring device as claimed in claim 1, wherein said light source emits incoherent light.

* * * * *